Dec. 19, 1967          L. B. WILLIAMS, JR          3,358,919
              RATIO ANALYZING APPARATUS AND METHOD
Filed Aug. 26, 1966                                3 Sheets-Sheet 1

INVENTOR.
LOUIS BENJAMIN WILLIAMS, JR.
BY
Kelly O. Corley
ATTORNEY

Dec. 19, 1967     L. B. WILLIAMS, JR     3,358,919
RATIO ANALYZING APPARATUS AND METHOD
Filed Aug. 26, 1966     3 Sheets-Sheet 2
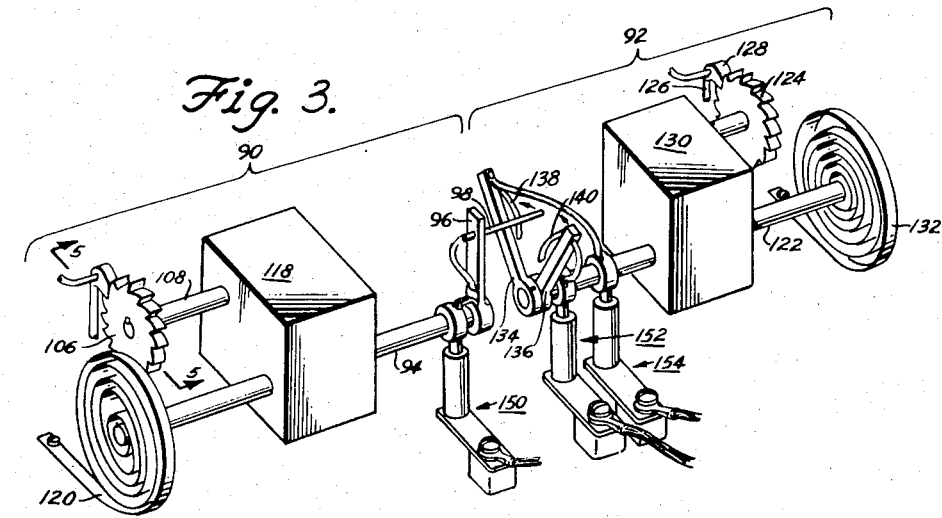
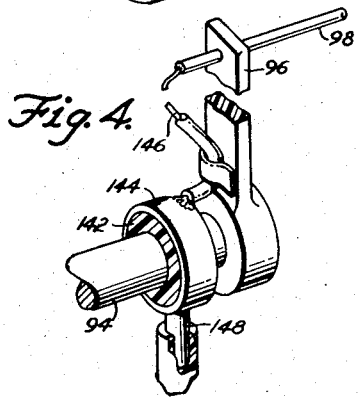
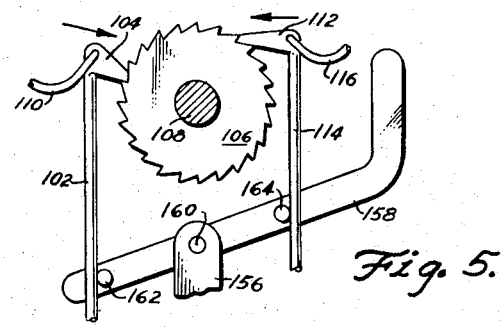
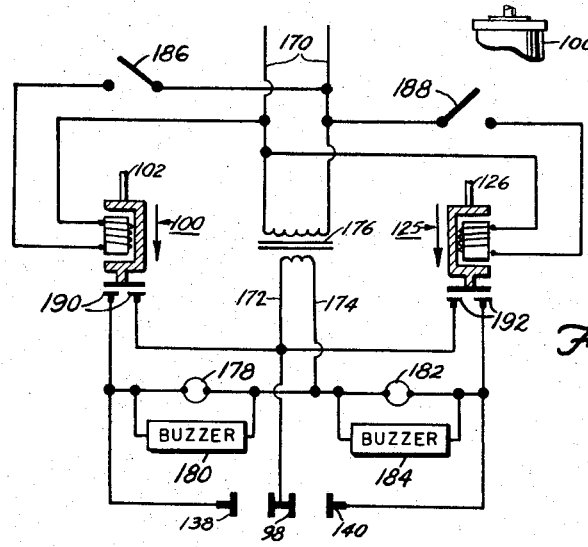
INVENTOR.
LOUIS BENJAMIN WILLIAMS, JR.

INVENTOR.
LOUIS BENJAMIN WILLIAMS, JR.

United States Patent Office 3,358,919
Patented Dec. 19, 1967

3,358,919
RATIO ANALYZING APPARATUS AND METHOD
Louis B. Williams, Jr., Pensacola, Fla., assignor to Monsanto Company, St. Louis, Mo., a corporation of Delaware
Filed Aug. 26, 1966, Ser. No. 575,332
8 Claims. (Cl. 235—61)

ABSTRACT OF THE DISCLOSURE

A sampling analyzer having an actuator and limit contacts carried in preset, spaced positions on respective members at least one being adapted for movement in one direction by a given incremental distance in response to a first signal and in the opposite direction by a different given incremental distance in response to a second signal, whereby a positive or negative determination is made depending on the limit contact approached by the actuator. The sampling method includes the steps of increasing by a given increment the distance from an actuator to a first limit member along a predefined linear or curvilinear path of fixed length connecting the first limit member to a second limit member in response to each occurrence of a first signal, increasing by a different given increment the distance along the predefined linear or curvilinear path of fixed length from said actuator to the second limit member in response to each occurrence of a second signal, and detecting when the actuator actuates either of the limit members.

---

This application is a continuation-in-part of copending application number 253,217, filed Jan. 22, 1963, now abandoned.

The present invention concerns an analyzer or computer which determines a relationship of two input variables and determines when the observed relationship departs from a given preset relationship.

Occasions arise wherein it is desired to determine when the relationship between two quantities varies outside of a given range. As an example certain quality control or inspection plans are used to maintain a given quality level with a minimum of actual inspection. A typical plan involves sequential sampling wherein individual units of a lot are inspected for conformity to given quality standards. It may be desired to reject the entire lot if the "reject" level is discovered by such sequential sampling to be too high, and to pass the lot if rejects are below a certain lower level.

The present invention is illustrated in such an environment, although the applications for the herein disclosed method and apparatus are not so limited.

Accordingly, a primary object of the invention is to provide an electro-mechanical analyzer for comparing two input variables with a preset relationship;

A further object of the invention is to provide an analyzer of the above character which determines when the observed relationship departs from a given preset range;

A further object is to provide an analyzer wherein the preset relationship may be readily varied;

A further object is to provide an analyzer of the above character which continuously analyzes the relationship between two input variables irrespective of the absolute values of the variables;

A further object is to provide an analyzer employing sensing elements which are physically moved relative to one another in accordance with the input signals;

A further object is to provide an analyzer which is simple, reliable in operation, and economical.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a more complete understanding of the nature and objects of the invention, reference should be had to the following detailed description taken in connection with the accompanying drawings, in which:

FIGURE 3 is a schematic perspective view of an alternative embodiment of the invention;

FIGURE 4 is a fragmentary perspective view of one brush arm of the FIGURE 3 device showing the construction details;

FIGURE 5 is a fragmentary side elevation view taken on line 5—5 of FIGURE 3;

FIGURE 6 is a schematic circuit diagram of an exemplary circuit which may be used with the FIGURE 3 apparatus.

Figure 1:
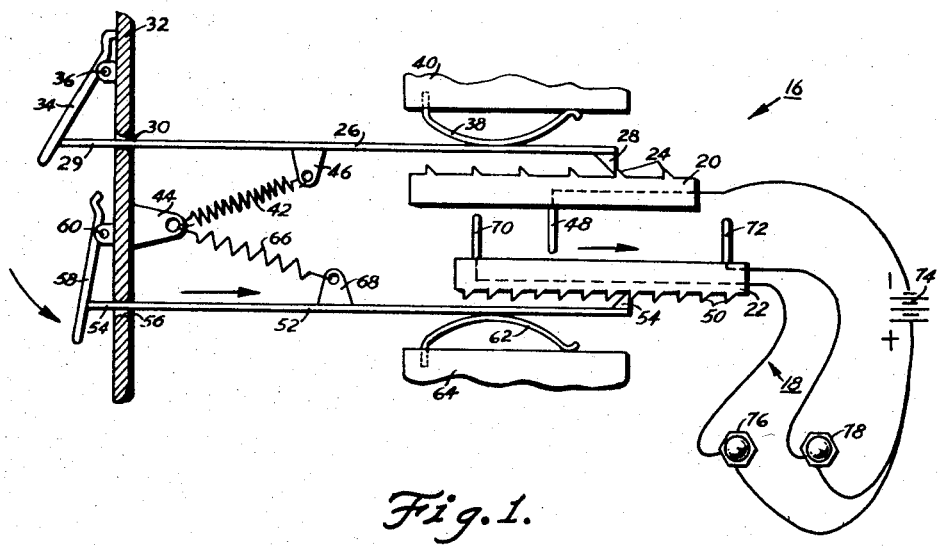
FIGURE 1 is a schematic fragmentary side elevation view of an exemplary embodiment of the invention.

Referring now to FIGURE 1, there is illustrated a basic linear-motion analyzer according to the present invention wherein the relationship between two quantities are continuously mechanically analyzed. As shown therein, the apparatus comprises an actuator carriage assembly 16 and a limit carriage assembly 18. Assemblies 16 and 18 comprise respectively first and second carriages 20 and 22, which are mounted for horizontal relative movement by suitable guide and support means (not illustrated) according to two input signals which are to analyzed. Carriage 20 has a plurality of axially spaced ratchet teeth 24 on its upper surface. A control rod 26 is mounted for sliding movement above and parallel to carriage 20, and has a downwardly extending pawl 28 on its right end as viewed in FIGURE 1, for cooperative engagement with teeth 24 in a manner to be described. The opposite end 29 of rod 26 extends through an aperture 30 in a vertical panel 32. A control lever 34 is pivotally mounted on panel 32 by a pivot mechanism 36 and has its lower end bearing on end 29. A leaf spring 38 mounted in a frame member 40 bears on the upper surface of rod 26 and resiliently urges rod 26 into engagement with the upper surface of carriage 20. A coil spring 42, attached between a tab 44 on the rear of panel 32 and a depending tab 46 in an intermediate region of rod 26, provides for resetting lever 26, and continuously urges rod 26 to the left as viewed in FIGURE 1. The upper end of lever 34 engages panel 32 and acts as a stop device when rod 26 has reached the reset position. Electrical actuator means or contact 48 extends downwardly from an intermediate portion of carriage 20 for a purpose to be explained.

Similarly, lower carriage 22 has a plurality of axially spaced ratchet teeth 50 on its lower surface. A lower control rod 52 is slidably mounted beneath and parallel to carriage 22 and has an upwardly extending pawl 54 on its right end as viewed in FIGURE 1 for cooperative engagement with teeth 50. The opposite end 54 of lower control rod 52 extends through a second aperture 56 in panel 32. A second lever 58 is pivotally mounted on panel 32 by a pivot mechanism 60, and has its lower end bearing on end 54. A leaf spring 62, mounted in a frame member 64, resiliently urges the right end of control rod 52 and its pawl 54 into cooperative engagement with the lower surface of carriage 22 and teeth 50. A return coil spring 66 connects tab 44 with a tab 68 on an intermediate portion of rod 52 for resetting rod 52. The upper end of lever 58 engages panel 32 and serves as a stop device when rod 52 reaches the reset position. The upper surface of carriage 22 bears first and second axially spaced limit means or contacts 70 and 72.

A battery 74 has one terminal directly connected to actuator contact 48 and its opposite terminal connected through a suitable light or other indicator 76 to the limit contact 70. A further indicator 78 connects limit contact 72 to the junction between indicator 76 and battery 74. In the circuitry thus illustrated the indicator 76 will be actuated when actuator contact 48 contacts limit terminal 70 and conversely indicator 78 will be actuated when actuator contact 48 contacts limit terminal 72.

As illustrated, the spacing between teeth 24 is greater than the spacing between teeth 50. Thus, when lever 34 is depressed to provide a first input, carriage 20 is moved a greater distance to the right as viewed in FIGURE 1 than is carriage 22 when lever 58 is depressed to indicate the second signal.

This difference in relative movement of carriages 20 and 22 with respect to each other resulting from a single actuation of their respective levers 34 and 58 is the basis for analyzers constructed according to the present invention.

Figure 2:
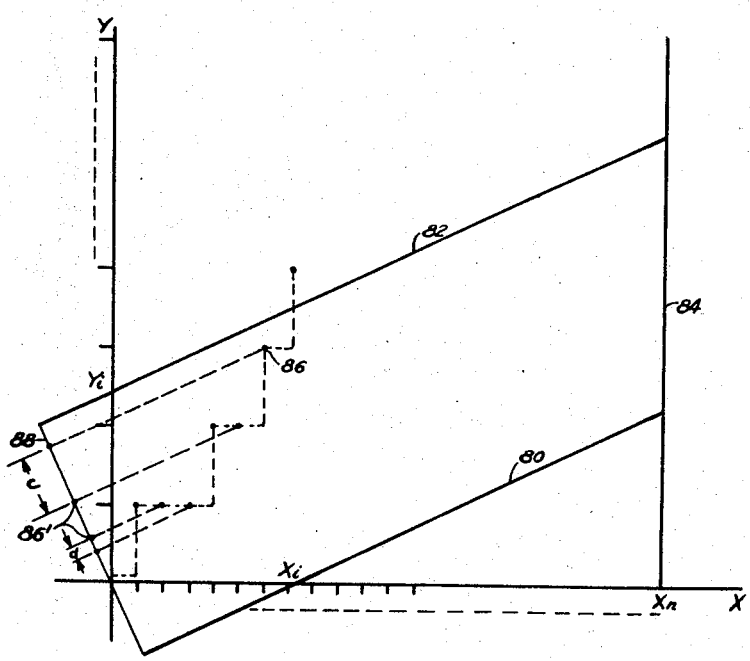
FIGURE 2 is a graph used to explain the theory of the invention.

Referring now to FIGURE 2, there is illlustrated a graphical representation of a typical sequential sampling quality control plan. As shown therein, the X-axis is laid out along the abscissa and the Y-axis is laid out along the ordinate, the axes intersecting at the origin. A pair of parallel lines, 80 and 82, are laid out on the chart with intercepts at "$Xi$" and "$Yi$." The X-axis is laid off to a scale representing the number of units inspected, while the Y-axis is laid off to represent the number of unacceptable or reject items. "$Xn$" represents the total number of units in a given lot. A line 84 vertical to the X-axis and intersecting the X-axis at $Xn$ completes the graph. The slopes of lines 80 and 82, and intercepts $Xi$ and $Yi$, the value of $Xn$ and other physical characteristics are determined by well known statistical methods and procedures.

The use of the FIGURE 2 chart may be demonstrated by the following considerations: Consider a point 86 starting at the origin and movable horizontally to the right in increments of X and vertically movable in increments of Y, as in the exemplary path shown in dotted lines. If a unit is inspected and found acceptable, point 86 moves horizontally to the right one X unit. If a unit is inspected and rejected, the point moves horizontally to the right one X unit and vertically upward one Y unit. This is repeated for each unit inspected until the point reaches or crosses one of lines 80, 82, or 84. The region below and to the right of line 80 may be considered as the "accept region," the region above and to the left of line 82 is the "reject region" and the area between lines 80 and 82 as an area of "indecision," which requires further sampling before a decision is reached. If point 86 crosses line 82, the entire lot would be rejected without further inspection, since the number of rejected units exceeds the number allowable as determined by the graph. Conversely, if point 86 crosses line 80, the entire lot would be accepted without further sampling. As long as point 86 remains in the region between lines 80 and 82, sampling is continued, and if point 86 remains between lines 80 and 82 until line 84 is reached, the lot will have been 100 percent inspected. Note that the width of the area of indecision determines the permissible range of variation permitted between accepted and rejected units before a decision is made to either reject or accept the entire lot.

While the sampling plan represented by FIGURE 2 could be administered by printed charts by physically plotting the movement of point 86 after each unit is sampled, such a procedure would be costly, time consuming, and difficult, as well as susceptible to errors. The present invention provides for administering the sampling plan by mechanical means. The apparatus illustrated in FIGURE 1 is a simple mechanical analog of the sampling plan presented by the FIGURE 2 graph, and may be readily designed to analyze input data in accordance with a given plan such as illustrated in FIGURE 2. Referring again to the graph, a further line 88 is constructed through the origin and normal to lines 80 and 82. From each position of point 86, a projection 86' of point 86 may be made to line 88 as shown by dotted lines which extend parallel to lines 80 and 82. As is shown in FIGURE 2, the projection 86' moves along line 88 toward line 82 a distance $c$ each time point 86 moves to represent a rejected unit, and moves along line 88 away from line 82 a distance $d$ each time point 86 moves to represent an accepted unit. Thus the position of projection 86' with respect to the origin is determined by sequentially algebraically adding positive $c$ units and negative $d$ units corresponding to the sequence of movement of point 86.

In the FIGURE 1 apparatus, contacts 70 and 72 represent in principle the intersections of line 88 with lines 80 and 82, respectively, while actuator contact 48 represents in principal projection 86'. In the reset position of carriages 20 and 22, actuator contact 48 should be positioned such that the distance from contact 48 to contact 70 is to its distance from contact 72 as the distance of the origin in FIGURE 2 from line 80 along line 88 is to its distance from line 82 along line 88. The distance between teeth 24 bears the same relationship to the distance between teeth 50 as distance $c$ does to distance $d$.

When these relationships are established in the FIGURE 1 device, lever 34 is depressed for each rejected unit to advance carriage 20 the distance corresponding to one tooth 24, and when lever 34 is released, rod 26 and pawl 28 are returned by spring 66. This advances actuator contact 48 toward limit contact 72 a distance corresponding to distance $c$ in FIGURE 2. When lever 58 is depressed in response to an accepted unit to advance carriage 22 the distance corresponding to one tooth 50, limit contacts 70 and 72 are moved to the right as viewed in FIGURE 1 a distance corresponding to distance $d$ in FIGURE 1. Since this moves limit contact 72 away from actuator contact 48 and contact 70 toward contact 48, it is equivalent to moving actuator contact 48 to the left by one tooth 50, corresponding to distance $d$. The FIGURE 1 device thus in effect algebraically adds a plus quantity corresponding to distance $c$ for each actuation of lever 34 and a minus quantity corresponding to distance $d$ for each actuation of lever 58, and mechanically analyzes the input data according to the selected sampling plan.

It will be understood that carriages 20 and 22 and their corresponding toothed surfaces would be made as long as desired for a selected sampling plan, and may include means for withdrawing pawl 28 from engagement with teeth 24 whereby carriage 20 may be returned to the reset position, and similarly may include means for withdrawing pawl 54 from engagement with teeth 50 whereby carriage 22 may be returned to the reset position. Preferably, resetting of the carriages would be simultaneously accomplished.

Referring now to FIGURES 3–5 there is shown an analyzing apparatus which achieves by rotary motion generally the same objects achieved by the linear motion of the FIGURE 1 device.

Referring now to FIGURE 3, the apparatus generally comprises an actuating assembly 90 and a limiting assembly 92. Actuating assembly 90 includes a shaft 94 mounted for rotary motion about its axis. Shaft 94 bears rigidly attached to one end a radially extending insulating arm 96. An actuating means or contact 98 mounted upon arm 96 at its outer end extends substantially parallel to shaft 94. Shaft 94 is rotated in response to a first signal by the apparatus illustrated in FIGURES 3 and 5. Thus, a solenoid 100 (FIGURE 5) is mounted on a frame member (not illustrated) to the rear of shaft 94, as viewed in FIGURE 3. The armature of solenoid 100 is connected to a link 102 to a pawl 104. Toothed ratchet disc 106 is rigidly mounted on ratchet shaft 108 adjacent to pawl 104. A spring 110 mounted on a suitable frame member resiliently urges pawl 104 into engagement with the toothed periphery of ratchet disc 106, whereupon each downward actuation of the armature of solenoid 100 advances ratchet disc 106 through a given arc. As shown in FIGURE 5, a further non-return pawl 112 is mounted on the upper end of rod 114 adjacent disc 106, and is urged into engagement with the toothed periphery of disc 106 by a suitable spring 116. Pawl 112 thus prevents inadvertent reverse rotation of disc 106. The incremental arcuate movement thus imparted to shaft 108 by each actuation of solenoid 100 is imparted to shaft 94 by a suitable gear train mechanism 118. Thus, gear train mechanism 118 may be so arranged as to rotate sahft 94 in the counterclockwise direction as viewed in FIGURE 3 upon each actuation of solenoid 100. Preferably, means are provided which resiliently urge shaft 94 in a clockwise direction, against the motion imparted by solenoid 100, to insure a proper seating of pawl 112 into the appropriate notch in the periphery of disc 106, and provide for resetting of the apparatus. This may be accomplished for example by a spring 120 as illustrated or by similar resilient means which applies a clockwise torque to shaft 94, such as an electrical torque motor.

Limiting assembly 92 is generally similar to assembly 90 and will accordingly not be described in detail. However, a second solenoid 125 (FIGURE 6) is mounted to the rear of shaft 122 and beneath a ratchet disc 124, and actuates ratchet 124 by its link 126 and pawl 128. The incremental rotary motion of disc 124 is transmitted to shaft 122 through a second gear box assembly 130, and corresponding torque means (illustrated as a spring 132) are provided on shaft 122 to resiliently oppose rotation of shaft 122. Shaft 122 is aligned with the axis of shaft 94, and carries on its left-most end, as viewed in FIGURE 3, a pair of rigidly attached insulating arms 134 and 136, which extend on opposite sides of actuator contact 98. A spring-like electrical limit contact member 138 extends generally radially downwardly from the outer end of arm 134 on the side adjacent actuator contact 98, and a similar limit spring contact 140 extends downwardly from the side of arm 136 nearest actuator contact 98. Since arms 134 and 136 are rigidly attached or keyed on shaft 122, they are carried together in a fixed angular relationship as it rotates.

Referring now to FIGURE 4, the construction of insulating arm 96 and its associated electrical connections are illustrated. As shown therein, an annular insulating member 142 is mounted on shaft 94 and bears on its outer surface an electrical slip-ring 144. A conductor 146 connects slip-ring 144 to contact 98. A brush 148, mounted in a suitable holder assembly 150 bears on the periphery of slip-ring 144 to permit electrical connection through slip-ring 144 to contact 98 notwithstanding the required rotary annular incremental motion described by contact 98 during operation of the device. Suitable similar slip-ring assemblies 152 and 154 provide electrical connections to contacts 138 and 140 (see FIGURE 3).

Referring now to FIGURE 5, there is shown an exemplary resetting mechanism for releasing ratchet disc 106 so that actuating assembly 90 may be restored to the reset position by spring 120 (FIGURE 3). As shown therein, an upwardly extending frame member 156 is provided beneath disc 106. A reset lever 158 is pivotally mounted on the upper end of frame 156 by a pin 160, whereby lever 158 rotates in a plane parallel to the plane defined by links 102 and 114. First and second laterally extending pins 162 and 164 are mounted on lever 158 at greater radii from pivot pin 160 than the distance from pin 160 to the corresponding links 102 and 114. The right end of lever 158 as viewed in FIGURE 5 is formed into a handle by which lever 158 may be pivoted in a clockwise direction about pivot pin 160, to thus simultaneously urge pawl 104 and pawl 112 out of engagement with disc 106. When this occurs, shaft 94 is rotated in the clockwise direction as viewed in FIGURE 3 and through gear train assembly 118 restores disc 106 to the reset position. An identical resetting mechanism may be installed in limiting assembly 92, and the corresponding handle portions may be linked together for simultaneous operation to restore the entire apparatus at the same time. The same type of resetting mechanism may be used in the FIGURE 1 apparatus.

In the apparatus as thus described, the incremental arcuate curvilinear movement of contact 98 for each actuation of its solenoid is determined by the gear ratio inside gear box assembly 118, and similarly the incremental arcuate movement of contacts 138 and 140 is determined by the gear ratio of gear box assembly 130. By suitably selecting the gear ratios in these gear boxes, the relative movement of contact 98 with respect to contacts 138 and 140 may be adjusted to provide the results achieved in linear motion by the FIGURE 1 device.

In the reset position of assemblies 90 and 92, actuator contact 98 should be positioned such that the arcuate distance from contact 98 to contact 140 is to its distance from contact 138 as the distance of the origin in FIGURE 2 from line 80 along line 88 is to its distance from line 82 along line 88. The total angular distance between contacts 138 and 140 corresponds to the length of line 88, and the incremental angular movement produced at contact 98 by a single actuation of ratchet disc 106 bears the same relationship to the incremental angular movement imparted to contacts 138 and 140 for each actuation of ratchet disc 124 as distance $c$ does to distance $d$.

Referring now to FIGURE 6, there is shown a schematic circuit diagram illustrating a circuit which may advantageously be used with the FIGURE 3 embodiment. As shown therein, AC supply conductors 170 energize low voltage conductors 172 and 174 through a step-down transformer 176. Conductor 174 is connected through "reject" indicators illustrated as a light 178 and buzzer 180 in parallel, to contact 138. Conductor 174 is likewise connected through "accept" indicators illustrated as light 182 and buzzer 184 to contact 140. The remaining low voltage conductor 172 is connected to actuator contact 98, whereby when contact 98 is rotated sufficiently to engage contact 138, "reject" indicators 178 and 180 are actuated, and when contact 98 engages contact 140, indicators 182 and 184 are actuated.

Means are provided for inserting a "reject" signal input, illustrated as a manual switch 186 connected in series with the winding of solenoid 100 across supply conductors 170, whereby solenoid 100 is actuated each time switch 186 is closed. Similarly, "accept" switch means 188 is connected in series with the winding solenoid 125, whereby solenoid 125 actuates each time switch 188 is closed. As noted above, in the operation of FIGURE 3 device with the FIGURE 6 circuit, each actuation of switch 186 actuates solenoid 100, lowering link 102 and rotating ratchet disc 106 a given arcuate distance. This motion is imparted to rotate shaft 94 and contact 98 through a given arc toward "reject" limit contact 138. Similarly, each actuation of switch 188 actuates solenoid 125 and through ratchet disc 124 rotates shaft 122 through a given smaller arc as noted above.

The spring-like construction of contacts 138 and 140 shown in FIGURE 3 accommodates the slight reverse travel inherent in the illustrated structure as the non-return pawls seat into the appropriate notches on discs 106 and 124 under the urging of springs 120 and 132, when projection 86' actually crosses one of lines 80 or 82. However, occasions may arise when contact 98 would just touch contact 138 or 140, but would again be rotated out of contact when the non-return pawl seats to accurately locate contact 98. To prevent this occasional momentary completion of the low voltage circuit from being interpreted as a determination that projection 86' had crossed lines 82, auxiliary contacts 190 are provided on the armature of solenoid 100, and shunt contacts 98 and 138 each time switch 186 is closed. This momentary completion of the low voltage circuit not only prevents an occasional momentary signal from being interpreted as a signal determination, but provides a check on proper actuation of switch 186. A similar arrangement provides for the "accept" portion by addition of auxiliary contacts 192 to solenoid 125, shunting contacts 98 and 140 and momentarily actuating signals 182 and 184 with each actuation of switch 188. With the foregoing auxiliary contacts 190 and 192, it may be seen that final determination that projection 86' has crossed one of lines 80 and 82 is signaled by a continuous actuation of the appropriate signal indicators rather than momentary actuation.

Instead of manual actuation of switches 186 and 188, it is within the contemplation of the invention to initiate actuation of solenoids 100 and 125 by response to an automatic component testing system.

Figure 7:
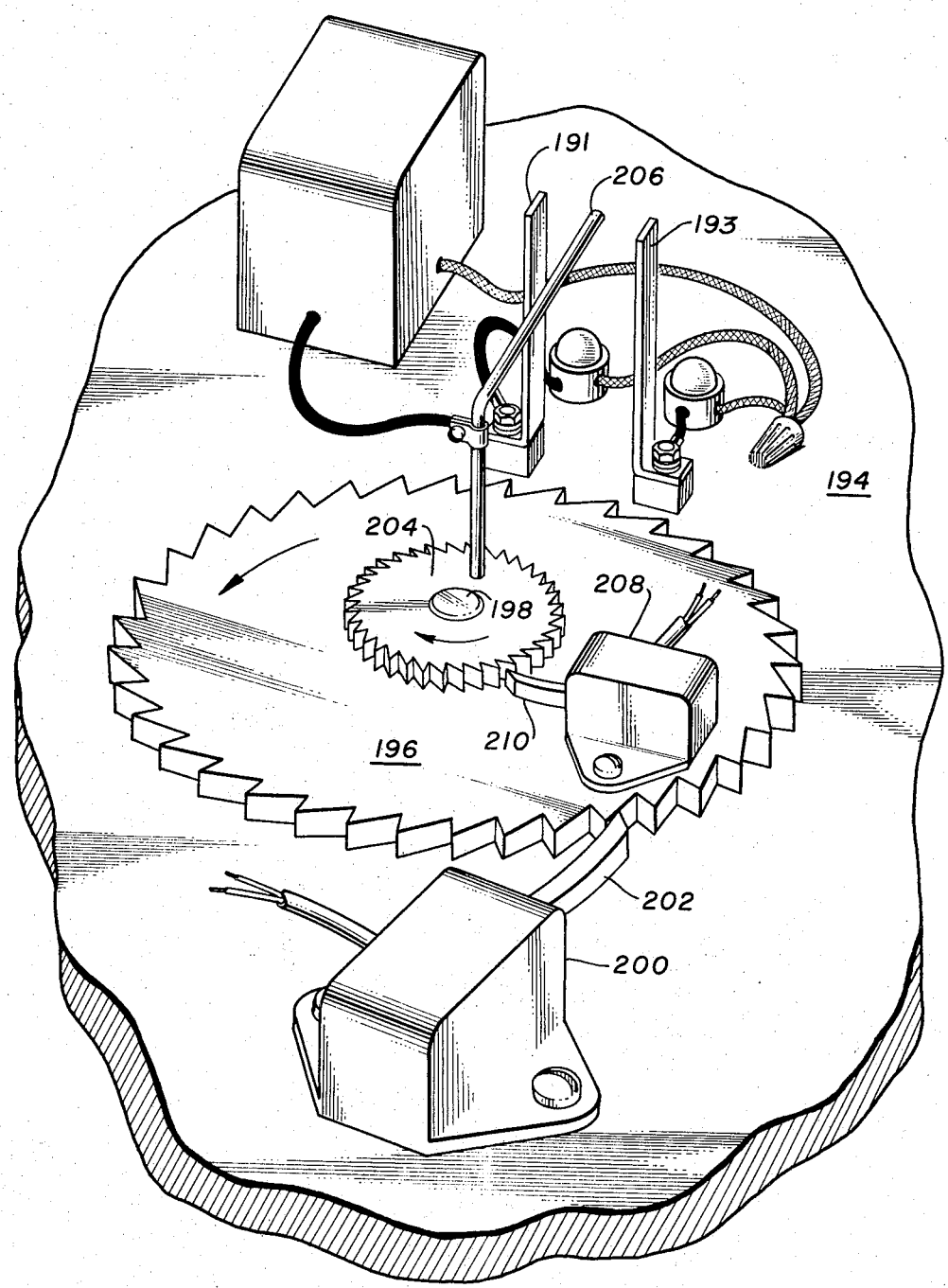
FIGURE 7 is a schematic perspective view of an alternative embodiment of the invention.

FIGURE 7 illustrates an embodiment of the invention wherein one member moves in opposite directions in response to the appropriate signals, while the other member remains stationary. As illustrated, limit means or contacts 191 and 193 are mounted on frame 194. A first horizontal ratchet wheel 196 is rotatably mounted on shaft 198. Solenoid 200, mounted on frame 194, has a pawl 202 for engaging the teeth of ratchet wheel 196 and rotating wheel 196 a given incremental distance counter clockwise as viewed in FIGURE 7 for each actuation of solenoid 200.

A second ratchet wheel 204 is rotatably mounted on shaft 198, and carries actuator means or contact 206 which extends between contact 191 and 193. A second solenoid 208 is mounted on wheel 196, and has pawl 210 engaging the peripheral teeth of wheel 204. Each actuation of solenoid 208 rotates wheel 204 a different given incremental distance clockwise, as viewed in FIGURE 7. It may be desirable to energize solenoid 208 through slip-rings, since wheel 196 may rotate a number of revolutuions during operation.

In the embodiment illustrated, there is sufficient friction between wheels 204 and 196 that wheel 204 moves with respect to wheel 196 only when solenoid 208 is actuated. Thus when wheel 196 is rotated, for example, three degrees counter clockwise by solenoid 200, wheel 204 is likewise rotated three degrees counter clockwise.

The method of the present invention may therefore be performed with various different forms of apparatus, and in fact may be performed by hand. Thus, paralleling the FIGURES 1 and 3 apparatus, contacts 70 and 72 may be manually spaced and incrementally moved in a given direction with each occurrence of a particular signal, while contact 48 may likewise be manually repositioned a different incremental distance in the same direction upon each occurrence of the other signal. Similarly with respect to the method paralleling the FIGURE 7 apparatus, contacts 191 and 193 may be manually located and spaced, while contact 206 is manually moved along a path connecting contact 191 and 193 a first incremental distance away from contact 191 and toward contact 193 in response to a first signal, and moved in the opposite direction along said path a different incremental distance in response to the other signal.

While the invention has been described as specifically including electrical contacts, other means can be used to determine departure of the observed relationship from the preset relationship. For example, contacts 70 and 72 in FIGURE 1 may be replaced by microswitches actuated by means 48. Various other detectors may be used, such as optical, magnetic, etc., as will occur to those skilled in the art.

Accordingly it will be seen that from the above description and drawings, there has been disclosed an electro-mechanical analyzer for comparing the accumulated totals of two input signals with a preset relationship. The analyzer converts these accumulated totals into physical movement of electrical contacts and determines when the observed realtionship departs from a given preset relationship. The rotary embodiment illustrated in FIGURE 3 may be readily preset to a given relationship by varying the gear ratios in gear box assemblies 118 and 130, according to the graphical analysis given above. A further advantage of the FIGURE 3 embodiment resides in the use of slip-ring electrical connections between the rotating contacts and the stationary circuitry. This permits the contacts on shafts 94 and 122 to continue their rotation over an extremely large range, if necessary, until a decision is ultimately reached. The FIGURES 3 and 7 embodiments may continue rotation without limit and therefore can analyze the relationship between the accumulated values of two input signals irrespective of the sizes of the accumulated signals. The disclosed analyzers are each simple, reliable, and economical both in original construction and in operation.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of administering a sequential sampling plan, comprising in combination:
   (a) increasing by a given increment the distance from an actuator to a first limit means along a linear path of fixed length connecting said first limit means to a second limit means, in response to each occurrence of a first signal,
   (b) increasing by a different given increment the distance along said linear path from said actuator to said second limit means, in response to each occurrence of a second signal,
   (c) and detecting when said actuator actuates either of said first and said second limit means.

2. An analyzer comprising in combination:
   (a) first and second limit means mounted a given distance apart on a first member,
   (b) an actuator positioned between said first and second limit means and mounted on a second member,
   (c) means for moving one of said members by a given incremental distance in a given direction so as to reduce the distance between said actuator and said first limit means and to increase the distance between said actuator and said second limit means in response to a first signal,
   (d) and means for moving said one of said members in the opposite direction by a different given incremental distance in response to a second signal.

3. The combination defined in claim 2, further comprising means for restoring said first and said second members to a reset position.

4. An analyzer comprising in combination:
   (a) first and second limit means mounted a given distance apart on a first member,
   (b) an actuator positioned between said first and second limit means and mounted on a second member,
   (c) first means for moving said second member and said actuator relative to said first member an incremental distance in a given direction in a given path toward said first limit means and away from said second limit means in response to a first signal,
   (d) and second means for moving said first member and said first and second limit means in said direction in a path parallel to said given path a different incremental distance in response to a second signal.

5. The combination defined in claim 4, further comprising means for restoring said first and said second members to a reset position.

6. A method of administering a sequential sampling plan as in claim 1, wherein, one of said first and second signals occurs for each sample analyzed.

7. A method of administering a sequential sampling plan, comprising in combination:
   (a) increasing by a given increment the distance from an actuator to a first limit means along an arcuate path of fixed length connecting said first limit means to a second limit means, in response to each occurrence of a first signal,
   (b) increasing by a different given increment the distance along said arcuate path from said actuator to second limit means, in response to each occurrence of a second signal,
   (c) and detecting when said actuator actuates either of said first and said second limit means.

8. A method of administering a sequential sampling plan, comprising in combination:
   (a) increasing by a given increment the distance from an actuator to a first limit means in one direction along a fixed actuator path of predetermined length connecting said first limit means to a second limit means, in response to each occurrence of a first signal,
   (b) increasing by a different given increment in an opposite direction the distance along said fixed actuator path from said actuator to said second limit means, in response to each occurrence of a second signal,
   (c) and detecting when said actuator actuates either of said first and said second limit means.

References Cited

UNITED STATES PATENTS 2,419,583   4/1947   McDavitt _____ 235—92
2,530,351   11/1950  Fales _____ 235—61

STEPHEN J. TOMSKY, *Primary Examiner.*

RICHARD B. WILKINSON, *Examiner.*

L. FRANKLIN, *Assistant Examiner.*